United States Patent [19]

Vensko et al.

[11] Patent Number: 4,624,008

[45] Date of Patent: Nov. 18, 1986

[54] APPARATUS FOR AUTOMATIC SPEECH RECOGNITION

[75] Inventors: George Vensko, Ramona; Lawrence Carlin; Mark W. Nelson, both of San Diego, all of Calif.; A. Richard Smith, Huntington, Conn.

[73] Assignee: International Telephone and Telegraph Corporation, New York, N.Y.

[21] Appl. No.: 473,422

[22] Filed: Mar. 9, 1983

[51] Int. Cl.[4] .................................... G10L 5/00
[52] U.S. Cl. .................................. 381/43; 364/513.5
[58] Field of Search ................. 381/41, 42, 43, 44, 381/45, 46, 47, 48, 49, 50; 364/513, 513.5

[56] References Cited

U.S. PATENT DOCUMENTS

| | | | |
|---|---|---|---|
| 4,049,913 | 9/1977 | Sakoe | 364/513.5 |
| 4,059,725 | 11/1977 | Sakoe | 179/1.5 D |
| 4,087,630 | 5/1978 | Browning et al. | 179/1 SD |
| 4,158,750 | 6/1979 | Sakoe | 179/1 SD |
| 4,167,653 | 9/1979 | Araseki | 179/1 SC |
| 4,191,858 | 3/1980 | Araseki | 179/15.55 |
| 4,227,176 | 10/1980 | Moshier | 381/45 |
| 4,227,177 | 10/1980 | Moshier | 381/45 |
| 4,239,936 | 12/1980 | Sakoe | 179/1 SD |
| 4,256,924 | 3/1981 | Sakoe | 364/1 SD |
| 4,277,644 | 7/1981 | Levinson et al. | 364/513.5 |
| 4,286,115 | 8/1981 | Sakoe | |
| 4,319,221 | 3/1982 | Sakoe | 340/146.3 Q |
| 4,326,101 | 4/1982 | Sakoe | 364/513.5 |
| 4,336,421 | 6/1982 | Welch et al. | 381/43 |
| 4,400,788 | 8/1983 | Myers et al. | 364/513 |
| 4,481,593 | 11/1984 | Bahler | 364/513.5 |
| 4,489,434 | 12/1984 | Moshier | 381/43 |
| 4,489,435 | 12/1984 | Moshier | 364/513.5 |

Primary Examiner—E. S. Matt Kemeny
Assistant Examiner—John J. Salotto
Attorney, Agent, or Firm—John T. O'Halloran; Jeffrey P. Morris

[57] ABSTRACT

An apparatus and method for recognition of sentences comprised of utterances separated by short pauses, the utterances representative of both isolated words and connected words. Speech to be recognized is converted into frames of digital signals. Selected ones of the frames of digital signals are compared with isolated word and connected word templates stored in a template memory. Recognition of isolated words is done by comparing the selected frames of digital signals with the isolated word templates in accordance with a windowed dynamic programming algorithm having path boundary control, while connected word recognition is accomplished by comparing selected frames of digital signals with the connected word templates in accordance with a full DPA having path score normalization and utterance frame penalty calculation capability. Variable frame rate encoding is used to identify the selected frames of digital signals. Syntax control includes selecting the isolated word and connected word templates to be compared after each utterance and includes combining the recognized isolated words and connected words into sentences in accordance with the predefined syntax after the end of the sentence has been detected. A logical set of connected words are the connected digits.

5 Claims, 15 Drawing Figures

FILTER CHARACTERISTICS

| CHANNEL | CLOCK INPUT KHz | CENTER FREQUENCY | 3 db BANDWIDTH |
|---|---|---|---|
| 1 | 17 | 125 | 26 |
| 2 | | 157 | 33 |
| 3 | | 196 | 41 |
| 4 | 34 | 250 | 53 |
| 5 | | 313 | 66 |
| 6 | | 391 | 82 |
| 7 | 68.2 | 501 | 105 |
| 8 | | 626 | 131 |
| 9 | | 783 | 164 |
| 10 | 136.5 | 1002 | 210 |
| 11 | | 1253 | 263 |
| 12 | | 1556 | 329 |
| 13 | 273 | 2003 | 421 |
| 14 | | 2505 | 526 |
| 15 | | 3131 | 656 |
| 16 | 456.1 | 4005 | 841 |
| 17 | | 5010 | 1052 |
| 18 | | 6263 | 1315 |
| 19 | 819.2 | 7515 | 4359 |

NOTE: THESE ARE NOMINAL FREQUENCIES WITH ABOUT ±5% TOLERANCE

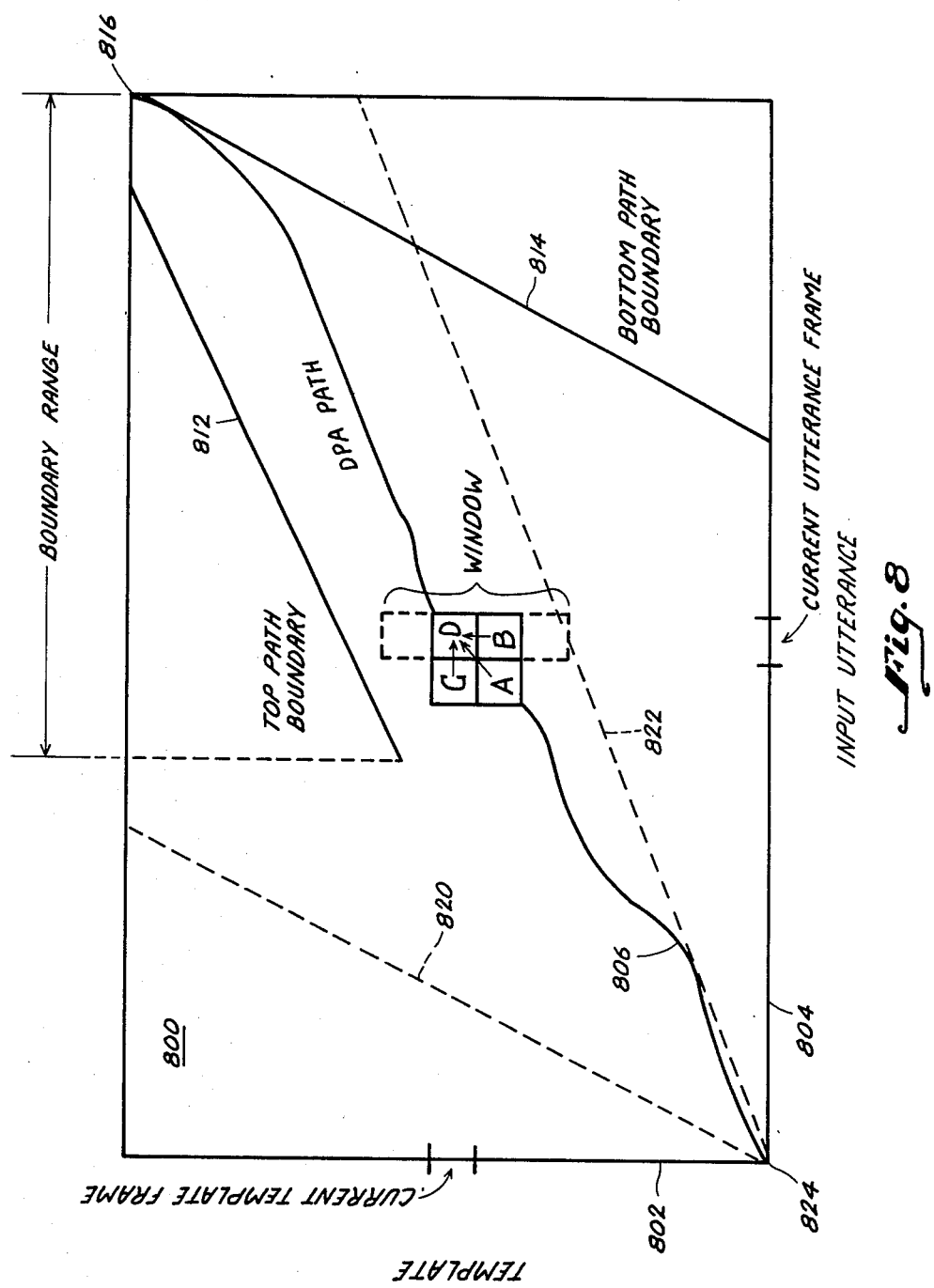

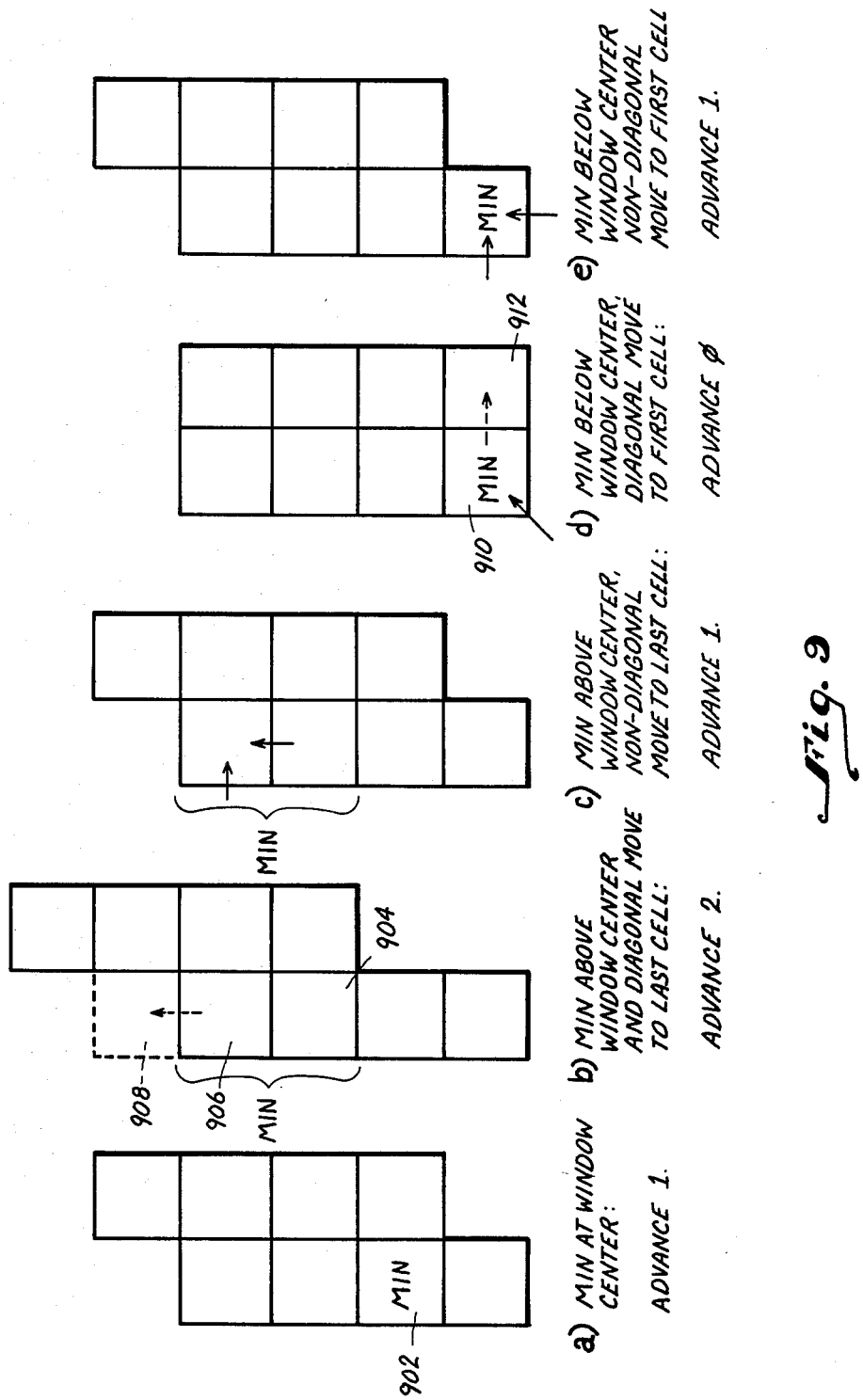

APPARATUS FOR AUTOMATIC SPEECH RECOGNITION

BACKGROUND OF THE INVENTION

This invention relates to an apparatus and method for automatic speech recognition. Automatic speech recognition systems provide a means for man to interface with communication equipment, computers and other machines in a human's most natural and convenient mode of communication. Where required, this will enable operators of telephones, computers, etc. to call others, enter data, request information and control systems when their hands and eyes are busy, when they are in the dark, or when they are unable to be stationary at a terminal. Also, machines using normal voice input require much less user training than do systems relying on complex keyboards, switches, push buttons and other similar devices.

One known approach to automatic speed recognition of isolated words involves the following: periodically sampling a bandpass filtered (BPF) audio speech input signal to create frames of data and then preprocessing the data to convert them to processed frames of parametric values which are more suitable for speech processing; storing a plurality of templates (each template is a plurality of previously created processed frames of parametric values representing a word, which when taken together form the reference vocabulary of the automatic speech recognizer); and comparing the processed frames of speech with the templates in accordance with a predetermined algorithm, such as the dynamic programming algorithm (DPA) described in an article by F. Itakura, entitled "Minimum prediction residual principle applied to speech recognition", IEEE Trans. Acoustics, Speech and Signal Processing, Vol. ASSP-23, pp. 67–72, February 1975, to find the best time alignment path or match between a given template and the spoken word.

Isolated word recognizers such as those outlined above require the user to artificially pause between every input word or phrase. This requirement is often too restrictive in a high workload and often stressful environment. Such an environment demands the very natural mode of continuous speech input. However, problems of identifying word boundaries in continuous speech recognition, along with larger vocabulary demands and the requirement of syntax control processing to identify only predefined meaningful phrases and sentences, requires added and more complex processing.

It is desirable to combine the relative ease of implementation of an isolated word recognizer with the advantages of continuous speech recognition when required in a single, inexpensive and less complex automatic speech recognition machine.

SUMMARY OF THE INVENTION

An apparatus and method for speech recognition of sentences in accordance with a predetermined syntax is disclosed. The sentences of speech comprise utterances separated by short pauses where the utterances are either isolated words or connected words. In the preferred embodiment, isolated word recognition is performed by comparing isolated word templates stored in a memory with frames of digital signals representative of speech in accordance with a windowed Dynamic Programming Algorithm (DPA) while connected word recognition is performed in accordance with a full DPA. The isolated word recognition algorithm further comprises path boundary control capability while the full DPA for connected word recognition further comprises path score normalization and utterance frame penalty computation. Variable frame rate encoding is used to limit the number of frames to be compared and in the preferred embodiment the connected word recognition comprises connected digit recognition.

BRIEF DESCRIPTION OF THE DRAWINGS

Objects, features and advantages of the present invention will become more fully apparent from the following detailed description of the preferred embodiment, the appended claims and the accompanying drawings, in which:

FIG. 2 is a more detailed block diagram of the bandpass filter portion of the invention of FIG. 1.

FIG. 8 is a graph summarizing the time alignment and matching, windowing, and boundary constraint operations of the Isolated Word recognition portion of the IW/CD algorithm of FIG. 4.

FIGS. 9A–9E summarize the window movement control function of the Isolated Word Recognition portion of the IW/CD algorithm of FIG. 4.

FIG. 14 is a block diagram of a preferred embodiment Voice Phone embodying the IW/CD apparatus of the present invention.

DETAILED DESCRIPTION OF THE DRAWINGS.

Figures 1, 3:
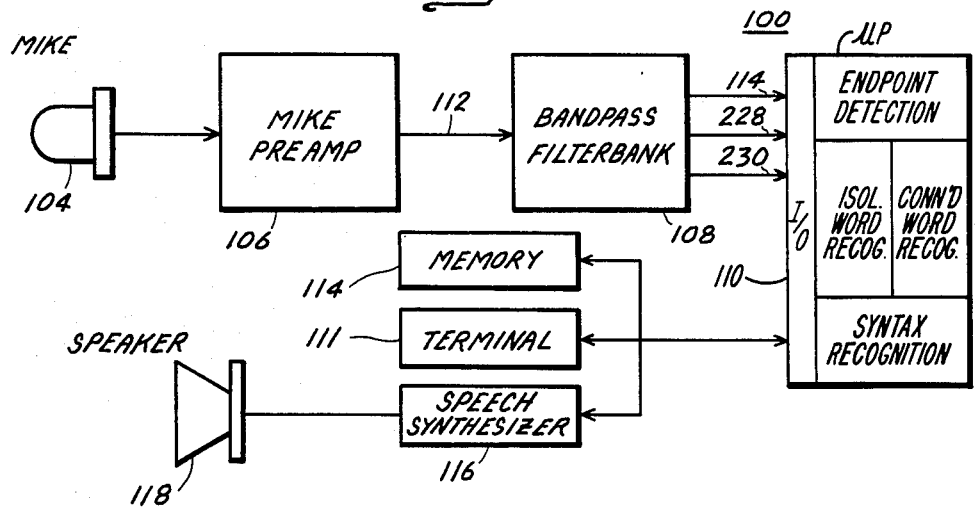
FIG. 1 is a preferred embodiment block diagram of the Isolated Word/Connected Digit apparatus of the present invention.
FIG. 3 is a table giving the filter characteristics of the bandpass filter portion of FIG. 2.

FIG. 1 is a block diagram of an isolated word/connected digit recognizer apparatus designated generally 100. It comprises a microphone 104 such as Shure Brothers, Inc. Model No. SM10; a preamplifier circuit 106, such as a Bogen Company Model No. PMM-2 circuit for amplifying the audio input to the microphone 104; a bandpass filter bank circuit 108 for providing a digital spectrum sampling of the audio output of the circuit 106; and a microprocessor 110 for processing the digital inputs from bandpass filter bank 108 in accordance with the isolated word/connected digit recognition algorithm for speech recognition stored in an EPROM memory portion of the Microprocessor 110. Also, shown in FIG. 1 are: an operator's interface 111, such as a Transterm terminal which has a keyboard and a 64-character LCD display interfaced with the microprocessor 110 via an RS 232 line; a nonvolatile mass storage device 114, such as an Exatron Stringy/Floppy having an RS 232 interface with the microprocessor 110; and a speech synthesizer 116 such as a National Semiconductor Digitalker with output speaker 118. The Transterm terminal, Exatron Stringy/Floppy and National Semiconductor Digitalker were chosen for their low cost and easy transportability.

The vocabulary capability of the preferred embodiment recognizer is 100 words, any ten of which can be spoken in connected fashion with a "real-time" recognition (less than 200 milliseconds response time). The Exatron Stringy/Floppy mass storage device 114 is an endless tape loop with a storage capacity of approximately 8K-bits per foot. The tape cartridges are available in lengths up to 50 ft. The 100 word vocabulary storage requirement is approximately 144,000 bits which can readily be stored on the 50-foot cartridge. The Digitalker is controlled through programmed I/O by the microprocessor 110. The synthesizer 116 interrupts the processor when it can accept additional outputs, after the initial word input. An 8-bit code is output to the synthesizer to select one of the words in the predefined vocabulary of the recognizer.

Referring now to FIG. 2, a more detailed block diagram of the bandpass filter bank circuit 108 is shown. The output from preamp 106 on lead 112 from FIG. 1 is transmitted to an input amplifier stage 200 which has a 3 db bandwidth of 10 kHZ. This is followed by a 6 dg/octave preemphasis amplifier 202 having selectable frequencies of 500 or 5000 Hz. This is conventional practice to provide more gain at the higher frequencies than at the lower frequencies since the higher frequencies are generally lower in amplitude in speech data. At the output of amplifier 202 the signal splits and is provided to the inputs of anti-aliasing filters 204 (with a cutoff frequency of 1.4 kHz) and 206 (with a cutoff frequency of 10.5 kHz). These are provided to eliminate aliasing which will result because of subsequent sampling.

The outputs of filters 204 and 206 are provided to bandpass filter circuits (BPF) 208 and BPF 210, respectively. BPF 208 includes channels 1-9 while BPF 210 includes channels 10-19. Each of channels 1-18 contains a ⅓ octave filter. Channel 19 contains a full octave filter. The channel filters are implemented in a conventional manner using Reticon Model Numbers R5604 and R5606 switched-capacitor devices. FIG. 3 gives the clock input frequency, center frequency and 3 db bandwidth of the 19 channels of the BPF circuits 208 and 210. The bandpass filter clock frequency inputs required for the BPF circuits 208 and 210 are generated in a conventional manner from a clock generator circuit 212 driven by a 1.632 MHz clock 213.

The outputs of BPF circuits 208 and 210 are rectified, low pass filtered (cutoff frequency=30 Hz) and sampled simultaneously in 19 sample and hold circuits (National Semiconductor Model No. LF398) in sampling circuitry 214. The 19 channel samples are then multiplexed through multiplexers 216 and 218 (Siliconix Model No. DG506) and converted from analog to digital signals in log A/D converter 220, a Siliconix device, Model No. DF331. The converter 220 has an 8 bit serial output which is converted to a parallel format in serial to parallel register 222 (National Semiconductor Model No. DM86LS62) for input to processor 110 via bus 114.

A 2 MHz clock 224 generates various timing signals for the circuitry 214, multiplexers 216 and 218 and for A/D converter 220. A sample and hold command is sent to circuitry 214 once every 10 milliseconds over lead 215. Then each of the sample and hold circuits is multiplexed sequentially (one every 500 microseconds) in response to a five bit selection signal transmitted via bus 217 to circuits 216 and 218 from timing circuit 226. Four bits are used by each circuit while one bit is used to select which circuit. It therefore takes 10 milliseconds to A/D convert 19 sampled channels plus a ground reference sample. These 20 digital signals are called a frame of data and they are transmitted over bus 114 at appropriate times to microprocessor 110. Once every frame a status signal is generated from timing generator circuit 226 and provided to processor 110 via lead 228. This signal serves to sync the filter circuit 108 timing to the processor 110 input. Timing generator circuit 226 further provides a 2 kHz data ready strobe via lead 230 to processor 110. This provides 20 interrupt signals per frame to processor 110.

Figure 4:
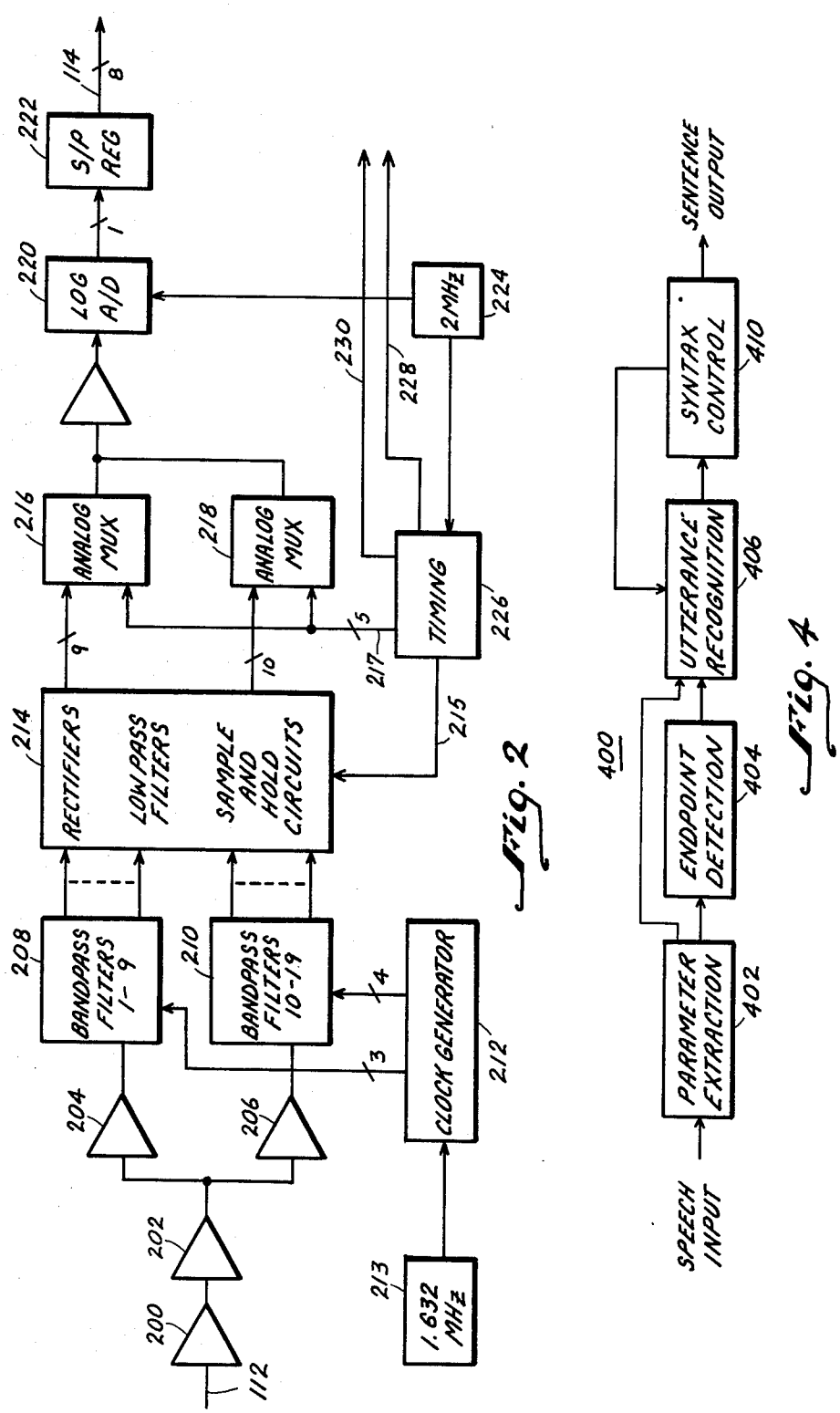
FIG. 4 is a preferred embodiment block diagram of the operation of the IW/CD algorithm portion of the present invention.

A description of the isolated word/connected digit (IWCD) algorithm stored in the EPROM memory of microprocessor 110 for processing the digital speech data to provide speech recognition is provided in connection with a description of FIGS. 4 through 13. Referring to FIG. 4, the IWCD speech recognition algorithm designated generally 400 can be divided into four subtasks as shown in FIG. 4: parameter extraction 402; sentence and utterance end point detection 404; utterance recognition 406 which includes isolated word recognition and connected digit recognition; and syntax control 410.

Throughout this application the word "utterance" will be used to indicate either a spoken isolated word or a spoken sequence of connected digits. Thus, the overall tasl of utterance recognition is the task of recognizing either an isolated word or a sequence of connected digits (or connected words if desired). The word "sentence" is used to mean a sequence of "utterances" separated by short pauses making up a complete expression defined by the syntax.

The frames of digitized speech signals from bandpass filter bank 108 are converted to five "Mel-cepstral" coefficients (to be discussed later) and one energy measure on the average of every 20 ms by the parameter extraction subtask 402. The sentence and utterance endpoint detection subtask 404 uses the energy measure to detect the beginning and ending of the sentence and mark the beginning and ending of each utterance within the sentence. This information is buffered so that the utterance recognition step can operate asynchronously with the input speech. The utterance recognition subtask uses either the windowed Dynamic Programming Algorithm (DPA) isolated word recognizer or a full DPA connected digit recognizer or both as needed. The final subtask of syntax control works with the utterance recognizer to determine from partial descriptions of the sentence and the syntactic constraints of the finite state grammar what templates should be matched against the next utterance of the sentence.

Figure 5:
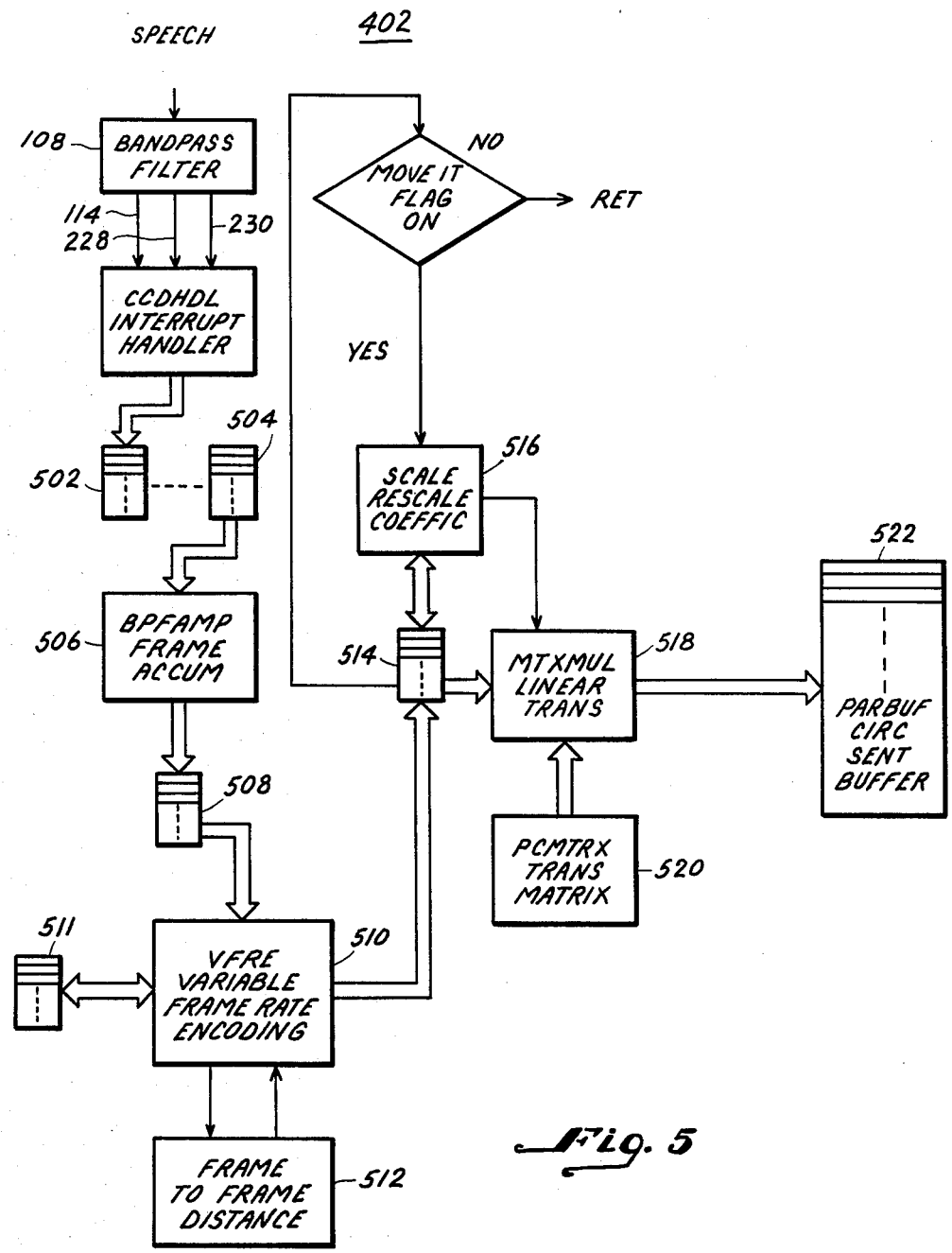
FIG. 5 is a more detailed block diagram of the parameter extraction portion of the IW/CD algorithm of FIG. 4.

Referring now to FIG. 5, as discussed before every 500 microseconds the microprocessor 110 is interrupted by the circuit 108 via lead 230. The software which handles that interrupt is the parameter extraction subtask 402. Usually the software merely stores the new filter value from bus 114 into a buffer such as any one of the buffers 502, 504, etc., and returns, but every 10 ms (the 20 interrupt) a new frame signal is sent via line 228. The algorithm takes the 19 filter values that were buffered, sums the values for a measure of amplitude, combines the first three values as the first coefficient, and the next two values as the second coefficient. See 506. The resulting 16 coefficients plus the amplitude measure characterize one 10 ms frame of the speech signal stored in buffer 508.

The frame of data from buffer 508 is passed to the variable rate frame encoding step 510. In this step, the distance between the current frame of data (from buffer 508) and a previously stored frame (in buffer 511) is measured. See 512. If the distance is small (large similarity) and not more than two frames of data have been skipped, the current frame is also passed over, otherwise it is stored for future comparisons in buffer 511 and passed on to the next step to buffer 514. On the average, one-half of the data frames from the circuit 108 are passed on (i.e. 50 frames per sec.).

If the IWCD recognizer apparatus 100 is actively "listening" for and recognizing speech (flag MOVEIT) is on), the new frame of speech data is scaled by shifting each filter coefficient up (the amount is a control variable) (see 516) and multiplied (see 518) by a linear transformation matrix 520. The matrix currently in use is made up of a family of 5 "mel-cosine" vectors that transform the bandpass filter data into an approximation of "mel-cepstral" coefficients. These 5 coefficients together with the amplitude measure are placed in the input sentence buffer 522 for use by the end point detection and recognition algorithms 404 and 406. The sentence buffer is a circular buffer, the size of which determines how much the recognition algorithm can trail the input speech. Mel-cosine linear transformations are discussed in (1) Davis, S. B. and Mermelstein, P. "Evaluation of Acoustic Parameters for Monosyllable Word Identification", Journal Acoust. Soc. Am., Vol. 64, Suppl. 1, pp. S180–181, Fall 1978 (Abstract) and (2) S. Davis and P. Mermelstein "Comparison of Parameter Representations for Monosyllabic Word Recognition in Continuously Spoken Sentences", IEEE Trans. Acoust., Speech, Signal Proc., Vol. ASSP-28, pp. 357–366.

End point detection 404 is the next step after the linear transformation. Thus, the end point 404 detection algorithms are activated every time the variable frame rate encoding algorithm 510 passes on a new frame of data to buffer 514 and the system is actively listening to speech (i.e. MOVEIT flag is on).

The end point detection algorithms can be separated into four basic steps. Sentence begin detection, utterance begin detection, utterance end detection, and sentence end detection. (Remember that an utterance is either an isolated word in the sentence or a sequence of connected digits, both of which have beginnings and ends tha must be detected). The end points of an utterance differ from the end points of a sentence primarily in that there will be a shorter pause around the utterance.

Figure 6:
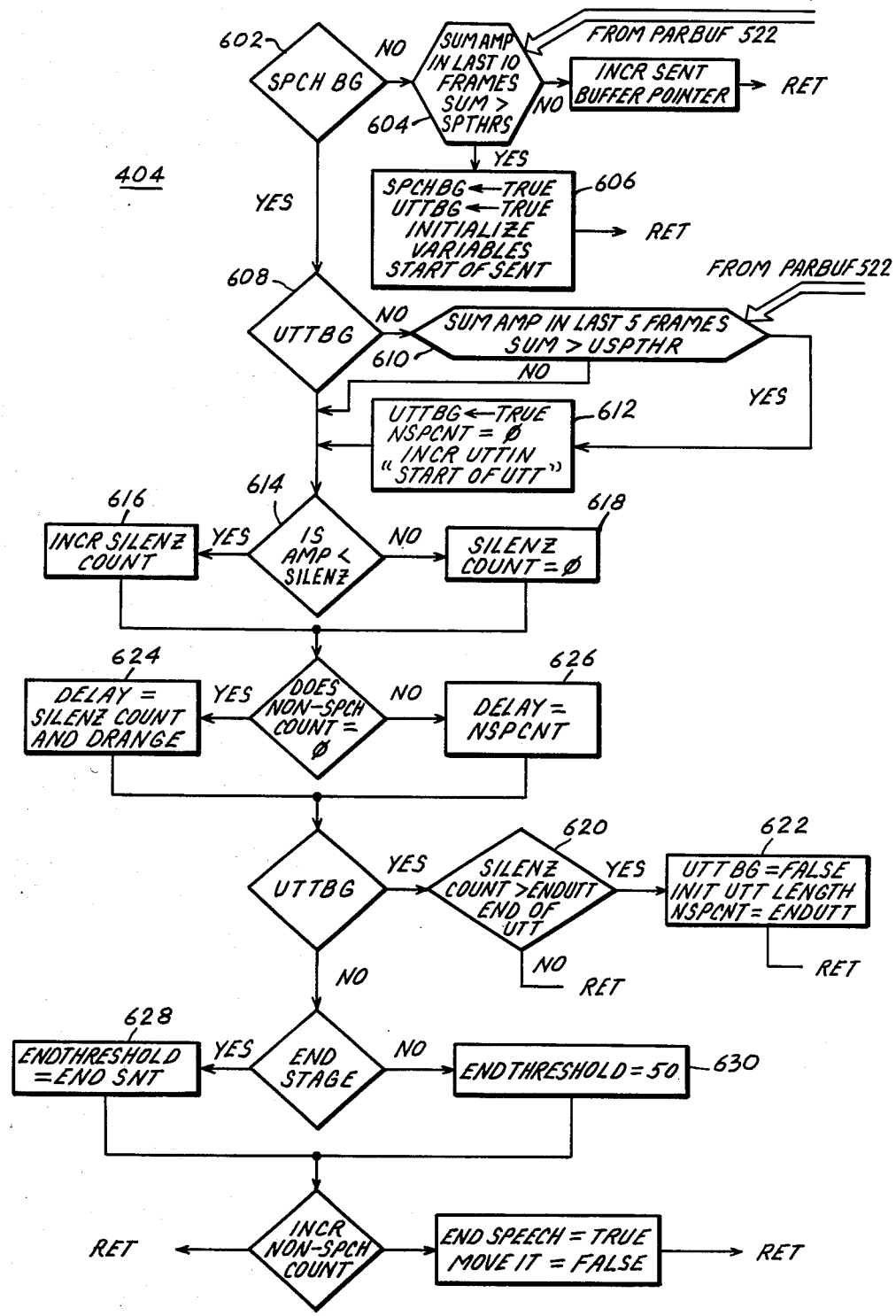
FIG. 6 is a more detailed block diagram of the sentence and utterance endpoint detection portion of the IW/CD algorithm of FIG. 4.

Referring now to FIG. 6, if the beginning of the sentence has not yet been found (SPCHBG 602 still false), the last ten amplitude measures from 522 are summed and compared with a speech threshold (SPTHRS) 604. To prevent a high amplitude "click" from falsely starting a sentence, each of the ten amplitudes are limited (PEKLIM) before summing. If the sum is greater than the speech threshold, the first frame of the ten with an amplitude greater than a "silence" threshold (SILENZ) becomes the first frame of the sentence and obviously the first frame of the first utterance. Flags are set 606 to indicate that the beginning of the sentence (SPCHBG) 602 and the utterance (UTTBG) 608 have been found. These flags remain on until the end of the sentence (SPCHBG) or current utterance (UTTBG) have been found. The setting of the SPCHBG flag permits the recognition algorithms to start.

The same type of algorithm is used to detect the beginning of utterances (other than the first utterance). However, amplitude summing is done over the previous five frames rather than ten, and a separate speech threshold is employed (USPTHR) 610. When an utterance is detected, a count of the number of utterances in the sentence is incremented (UTTIN) and a non-speech frame counter (NSPCNT) is set ot zero 612. This counter remains zero until the end of the utterance is found and is used to keep track of the number of frames in the pause between utterances or to indicate that the end of the sentence has occurred.

Throughout the sentence, the algorithm counts the number of consecutive frames having an amplitude below the silence threshold (SILENZ) 614 and 616. During an utterance the counter will generally have a zero value 618, but at the end of an utterance its value will build up until it exceeds the end of the utterance frame count threshold (ENDUTT) 620. When this happens the utterance flag is turned off (UTTBG), the length of the utterance is recorded, and the non-speech frame counter (NSPCNT) is initialized to the utterance frame count threshold (ENDUTT) 622. That is, the non-speech frame counter is set to the number of non-speech frames that have passed since the end of the utterance. This counter will then be incremented each frame until either a new utterance is found, or the counter exceeds a threshold indicating that the end of the sentence has occurred.

Using a non-speech counter as described rather than a straight silence-counter for end-of-sentence detection has a major advantage. The end-of-sentence detection is effectively determined by the utterance begin detection algorithm, i.e., no more utterances implies the end of the sentence. Noise at the end of the sentence is ignored as long as it does not look like the beginning of an utterance. As the utterance begin detector becomes more sophisticated, the end-of-sentence detector improves.

Two details indicated on the flowchart must be added to the above end point algorithm description. They are the purpose and setting of the delay (DELAY) variable, and the setting of the end-of-sentence frame threshold. The delay variable controls how many frames the recognition algorithm is delayed behind the input. Since the recognition algorithm takes special steps near the end of an utterance, it must be held back until the end is known. While processing an utterance (non-speech frame count equals zero), a sequence of silence frames may occur because the end has come. Therefore the delay variable is continually set to the silence counter plus the amount of delay needed by the recognition algorithm (DRANGE=max (ERANGE,BRANGE)) 624. Thus, if the recognition process is keeping up with the forced delay, it hesitates every time silence comes along. As soon as the end of the utterance is found, the delay variable is reset to the non-speech frame counter, now non-zero 626, and the recognition algorithm is permitted to process up through the end of the utterance (but not into the nonspeech part of the sentence).

The setting of the end-of-sentence frame threshold depends on whether or not the syntax control algorithm "thinks" that the speaker has spoken a complete sentence. Do all estimates of what the speaker said form a complete path in the finite state description of all sentences? If they do, then the end-of-sentence frame threshold is set to a control variable (ENDSNT) 628 having a value of 20 frames (but set by the user). If they do not, then the threshold is set to a value of 50 frames 630 (which currently is fixed, but need not be). If the system "thinks" the speaker has more to say, it waits up to one second for the speaker to continue.

Figure 7:
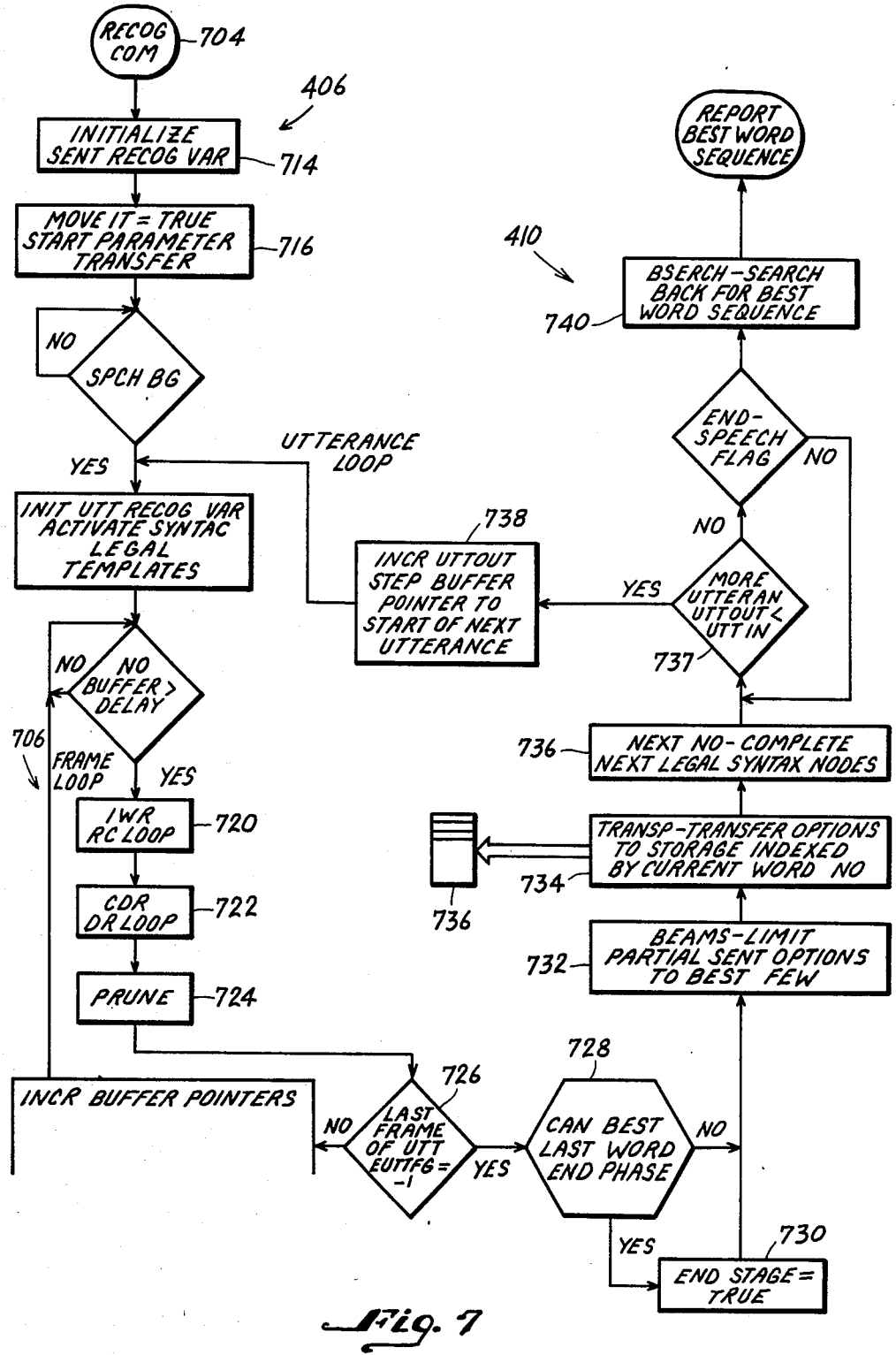
FIG. 7 is a more detailed block diagram of the recognition and syntax control portions of the IW/CD algorithm of FIG. 4.

Utterance recognition 406 is the heart of the IWCD algorithm and requires a major part of the processing time. This subtask is closely integrated with the subtask of syntax control 410 as shown in FIG. 7. The first column designated generally 406 of FIG. 7 starting with "Recognition Command" 704, together with the loop labeled "Frame Loop" designated generally 706 is a description of the utterance recognition subtasks 410. The flow path to the right of the column 406 is a description of the syntax control subtask 406. This part of the algorithm is executed after every utterance to determine what templates should be activated for matching against the next utterance in the sentence. This will be explained later.

When a recognition command is given by the user, e.g. from the terminal, the utterance recognition algorithm 406 first initializes variables relevant to the whole sentence (e.g., current utterance pointer UTTOUT=0) 714. The algorithm then sets a flag (MOVEIT) to tell the parameter extraction subtask that the system is waiting for speech 716. When the beginning of speech has been detected, variables relevant to the recognition of one utterance are initialized, and templates representing words that can start any sentence in the grammar are activated (via vector TPRACT) 718. Then every frame of the input utterance is processed by the algorithm via frame loop 706. However, the algorithm is delayed behind the actual input speech a set number of frames (=DELAY) 624 until the end of the utterance is detected as explained above. For each frame the isolated word recognition algorithm (RCLOOP) 720 and the connected digit recognition algorithm (DRLOOP) 722 are called in turn to process all active templates relative to their respective tasks. Thus, for example, if at a particular utterance in the sentence no digit templates are active, the connected digit recognition algorithm 722 does nothing. After each utterance frame, the best path scores for the isolated word templates are compared (PRUNE), and those templates with a path score greater than the overall best path score by a fixed amount (TPRUNE) are marked inactive 724. After the last frame of the utterance has been processed (EUTTFG equals −1), the syntax control algorithm begins 726.

The Isolated Word Recognition (IWR) 720 and Connected Digit Recognition 722 algorithms are based on the well-known dynamic programming algorithm (DPA) which is described in an article by F. Itakura entitled "Miminimum Prediction Residual Principle Applied to Speech Recognition", IEEE Trans. Acoustics, Speech and Signal Processing, Vol. ASSP-23, pp. 67–72, February 1975. The Isolated Word Recognition algorithm is a modified version of the DPA called "windowed DPA" and is similar to an algorithm investigated by Rabiner, L. R., Rosenberg, A. E., and Levinson, S. E., "Considerations in Dynamic Time Warping Algorithms for Discrete Word Recognition", IEEE Trans. on Acoustics, Speech and Signal Processing, Vol. ASSP-26, No. 6, pp. 575–582, Dec. 1978.

The IWR algorithm can be broken down into five functions that take part in the recognition of every active isolated word template:
1. Dynamic programming time alignment and matching (DPA for short),
2. Window movement control,
3. Path boundary control,
4. Path score normalization,
5. Partial sentence scoring and updating.

The last function is really part of the syntax control 410 and serves to tie the results of each template match into the overall goal of recognizing the sentence. It will be discussed along with the syntax control subtask.

Figure 10A:
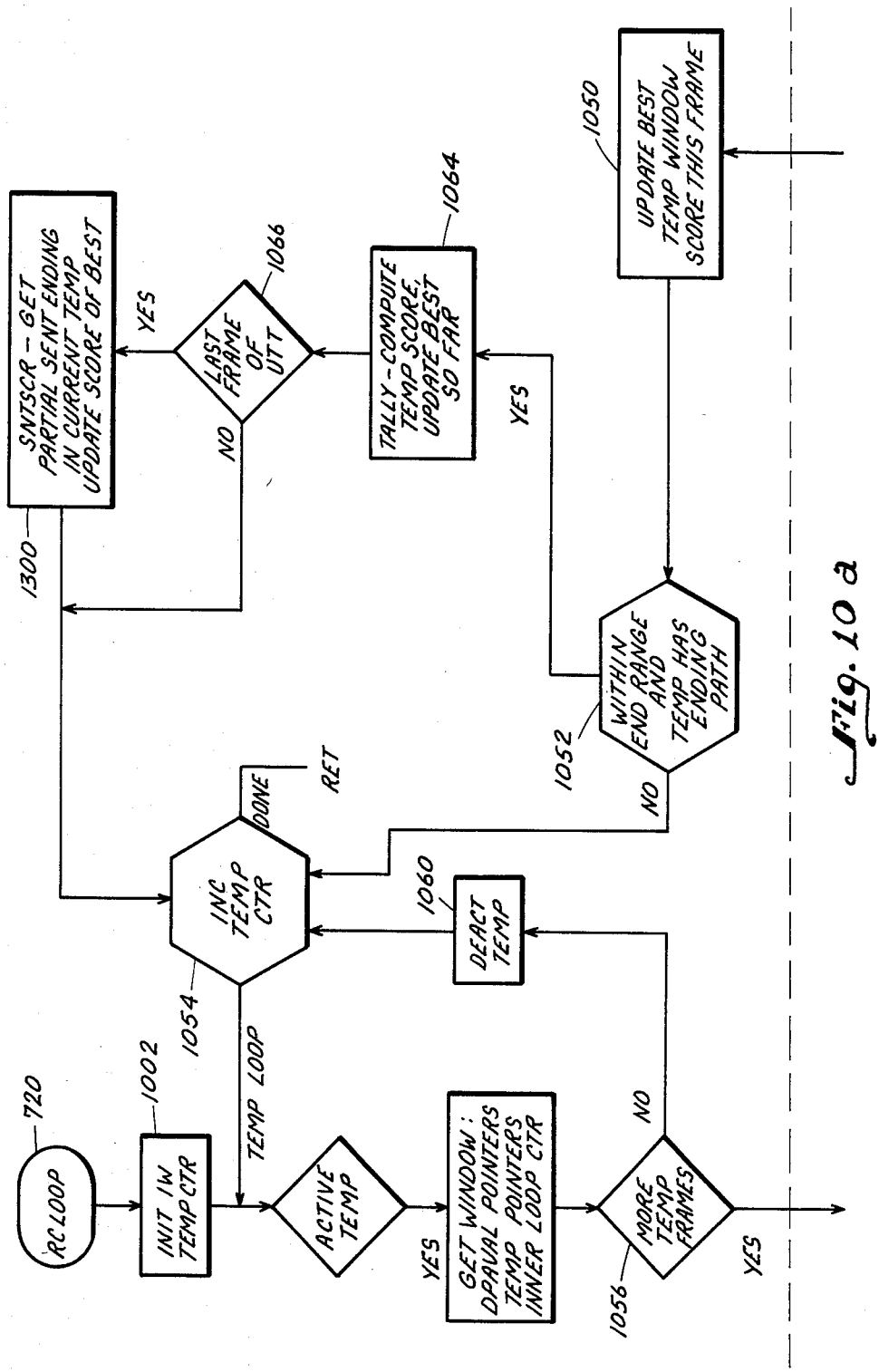
FIGS. 10A and 10B are a more detailed block diagram of the Isolated Word recognition portion of the IW/CD algorithm of FIG. 4.

Referring to FIGS. 8, 9, 10a and 10b, operation of the IWR algorithm is described. In FIG. 10a, the start of the IWR algorithm begins every new speech frame but acts only on active isolated word templates. FIG. 8 helps to illustrate the algorithm. A template is placed on the y-axis 802 and the input utterance is placed on the x-axis 804 to form a DPA matrix 800. Every cell in the matrix corresponds to a one-to-one mapping of a template frame with an utterance frame. Any time alignment between the frames of these patterns can be represented by a path through the matrix from the lower-left corner to the upper-right corner. A typical alignment path 806 is shown.

The DPA function finds the locally optimal path through the matrix by progressively finding the best path to each cell, D, in the matrix by extending the best path ending in the three adjacent cells labeled by variables, A, B, and C (see FIG. 8). The path that has the minimum score is selected to be extended to D subject to the local path constraint: every horizontal or vertical step must be followed by a diagonal step. For example, if a vertical step was made into cell C, the path at cell C cannot be chosen as the best path to cell D. The path score at cell D (DPAVAL) is updated with the previous path score (from A, B, or C) 1004 plus the frame-to-frame distance at cell D 1006. This distance is doubled before adding if a diagonal step was chosen to aid in path score normalization. The movement of the DPA function is along the template axis for each utterance frame. Thus, the function just described is repeated in the innermost loop of the algorithm designated generally 1020 in FIG. 10b by resetting the B variable to cell D's score, the A variable to cell C's score 1008 and retrieving from storage and new value for C 1002.

Rather than process every cell in the matrix, only a window of four cells are processed for a template for each utterance frame. The location of this window is determined by the window movement control function designated generally 1030. The goal of the function is to center the window around the locally best path so that, hopefully, the overall best path will be found through the matrix with a minimum of effort. The location of the cell with the minimum path score is saved during the DPA function so that the window movement can be adjusted optimally.

FIG. 9a–e and FIG. 10b summarizes the window movements. The center of the window is defined to be the second cell up 902 in FIG. 9a. If the window minimum is at the center 1031, a movement control variable is set so that the window will be advanced up one template frame for the next utterance frame 1032.

If the window minimum is above the center 1033 (third or fourth cells 904 or 906 in FIG. 9b) it is desirable to advance the window by two template frames for the next utterance frame. This is achieved by shifting the window up one cell in the current utterance frame 908 and setting the control variable to advance the window one template frame for the next utterance frame 1034. Since shifting the window in place forces a vertical path step out of the fourth cell, this process is prevented by the local path constraint if there was not a diagonal step into the fourth cell. In that case the window will be advanced only one cell 1035. See FIG. 9c.

If the window minimum is below the center (first cell 910 in FIG. 9d), generally it is desirable to leave the window at the same level, i.e., don't advance 912 and 1036. However, if a non-diagonal move was made into the first cell, there can be no horizontal step out of the first cell making "don't advance" decision pointless. In that case a window advance of one template frame will be made 1037. See FIG. 9e.

Figure 10B:
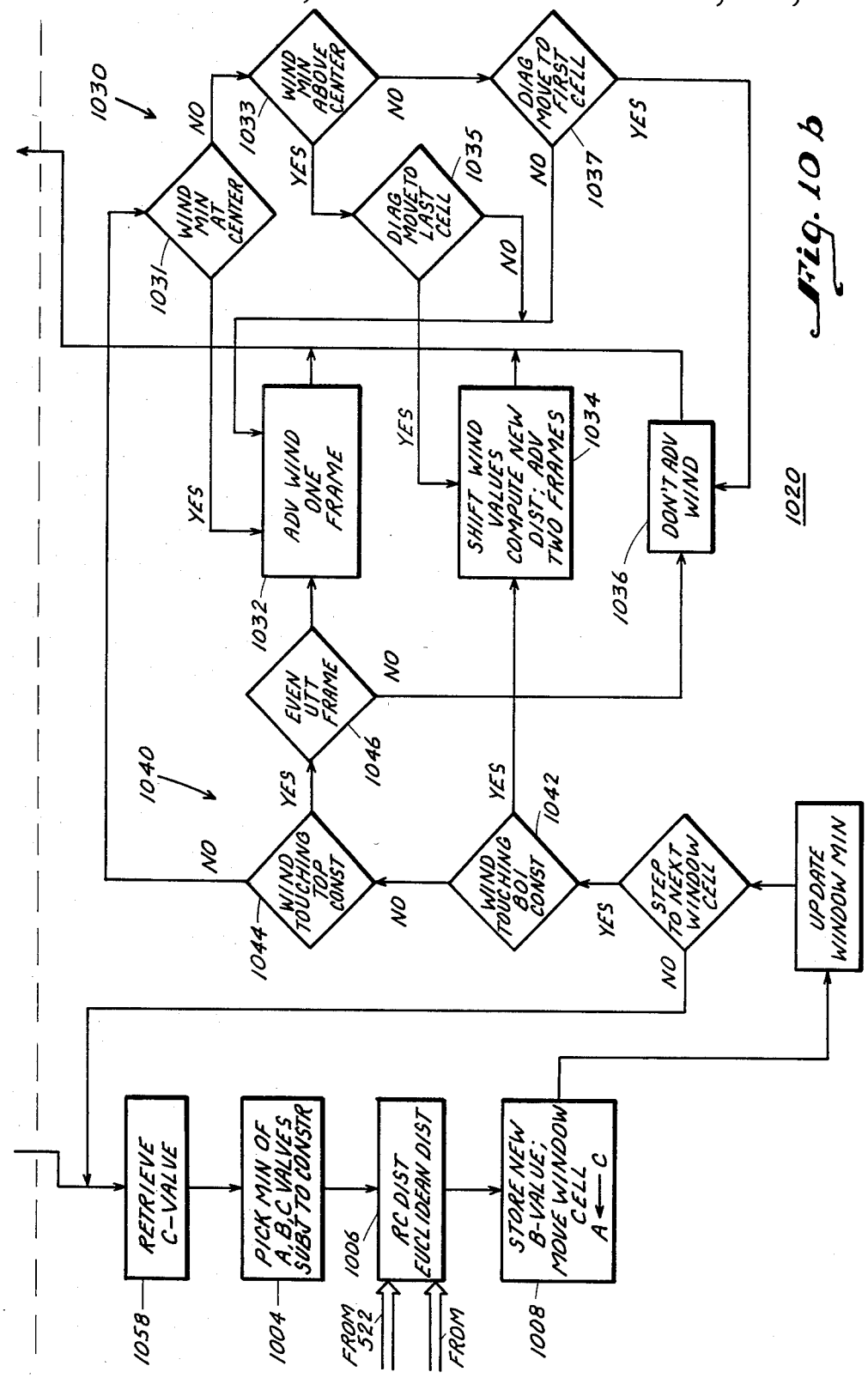

The third function of path boundary control designated generally 1040 in FIG. 10b also effects window movement. The effect of these controls keeps the window and thus the selection of the best path within the diagonal lines 812 and 814 drawn from the top right corner 816 of the DPA matrix 800 of FIG. 8. (The dotted diagonal lines 820 and 822 starting at the lower-left corner 824 are path boundaries that arise naturally from the local path constraints). The boundary constraints are applied when the recognition process is within boundary-range frames (BRANGE) from the end of the utterance. The constraints keep the window movement from wandering into regions in which a path cannot be extended to the upper-right corner of the matrix. The bottom constraint 814 is a variable (BOTLIM) giving the template frame number below which the window cannot go. It describes a line with a slope of 2 by being advanced by two every utterance frame. If the first cell of the window is equal to the bottom constraint 814 variable, the window is forced to advance by two cells 1042. Since the variable is being incremented by the same amount, once the window touches the bottom constraint 814 it is forced up the line to the end of the template and utterance.

The top constraint variable 812 (TOPLIM) is incremented one frame every other utterance frame and describes a line with a slope of one-half. If the top of the window touches this constraint 1044 its movement alternates between "don't advance" and "advance by one" 1046. Thus, the top constraint also forces the window to follow its path.

After processing each template frame against the current utterance frame, the best template window score is determined 1050, and a determination is made as to whether the current template frame is within an end range of the template and if the template has an ending path 1052. If not, the template counter is incremented 1054, and if more frames remain in the template 1056 the template inner loop described above is repeated after retrieving the current C cell value 1058. Otherwise, the template is deactivated 1060.

The isolated word recognition algorithm 720 permits the last several frames of the input utterance to be skipped. This is achieved by moving the top path boundary constraint back a few frames from the end of the utterance. The scores of the paths ending in these frames are normalized and compared so that the best path is chosen. This is done by the fourth function, path score normalization (TALLY). See 1064 in FIG. 10a.

When all the template frames of all the templates being processed are finished for the current frame, the next frame is processed 1066.

The Connected Digit Recognition Algorithm 722 can be broken into the following functions:
1. Dynamic programming time alignment and matching (DPA for short),
2. Connected digit phrase score and update,
3. Utterance frame penalty computation,
4. Best digit phrase retrieval,
5. Partial sentence scoring and updating.

Again the last function is part of the syntax control subtask and will be discussed later. Note that there are no window or path boundary constraints used in this recognition algorithm. A full DPA is used in the connected digit recognizer in contrast to the windowed DPA used in the isolated word recognizer. The reason for this is that in a connected digit utterance a particular template might begin or end anywhere in the utterance. A windowed DPA must know the end points in advance.

Figure 11:
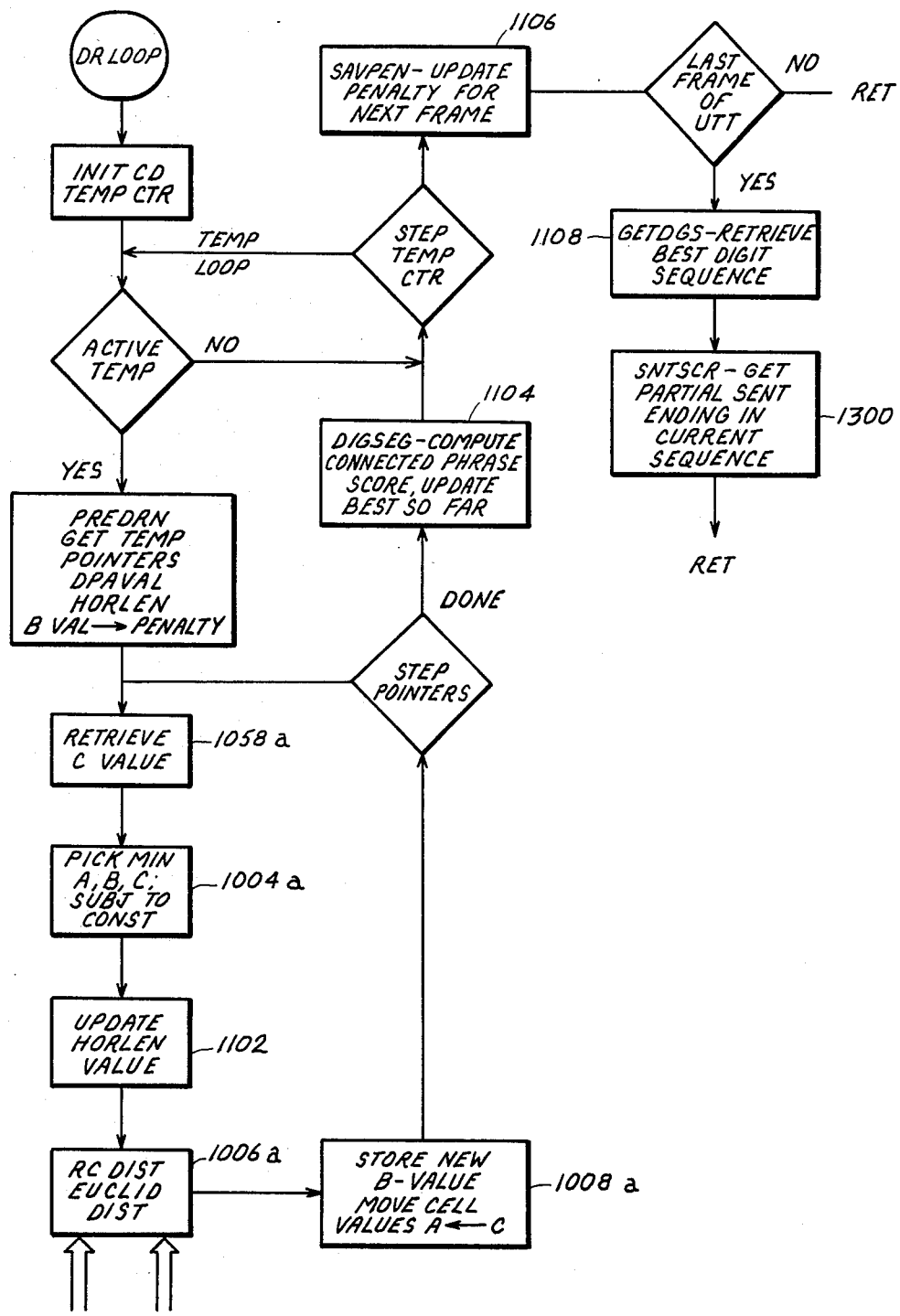
FIG. 11 is a more detailed block diagram of the Connected Digit recognition portion of the IW/CD algorithm of FIG. 4.

Referring to FIG. 11, the DPA function is the same as in the isolated word recognition algorithm (1058a, 1004a, 1006a and 1008a) except that a horizontal length variable (HORLEN) 1102 in FIG. 11 is kept in parallel with the path score (DPAVAL) for each cell of the DPA matrix. This variable keeps track of the number of utterance frames spanned by the DPA path for the template and is used as an index to link the current template to the one preceding it in the utterance. In order to keep track of what templates match where in the utterance and to be able to later link them together for obtaining the best matching connected digit phrase, several types of information must be saved for every utterance frame:
1. The best template ending this frame,
2. A pointer to the last frame of the previous matched template,
3. The total path score of the best partial digit phrase ending this frame.
4. The total number of template frames in the partial digit phrase,
5. The normalized path score for the partial digit phrase.

A DPA alignment path ends for each template at each frame of the utterance, except for the first N frames where N is one-half the number of frames in the template (due to the local path constraints). Each ending path for a template represents the completion of a partial digit phrase ending in the digit represented by the template and matching the utterance from its beginning up to the current utterance frame. The purpose of the connected digit phrase score and update function (DIGSEQ) 1104 is to compute a normalized path score for each of these partial phrases and save the best one. The normalized path score is equal to the sum of the path score of the partial phrase ending one frame before the template begins plus the path score of the template, normalized by the total path steps taken to get to the current location in the matrix. This number will be the total number of template frames in the partial phrase plus the number of frames in the utterance. Therefore the normalized path score is an average frame-to-frame distance over the entire path.

Figure 12:
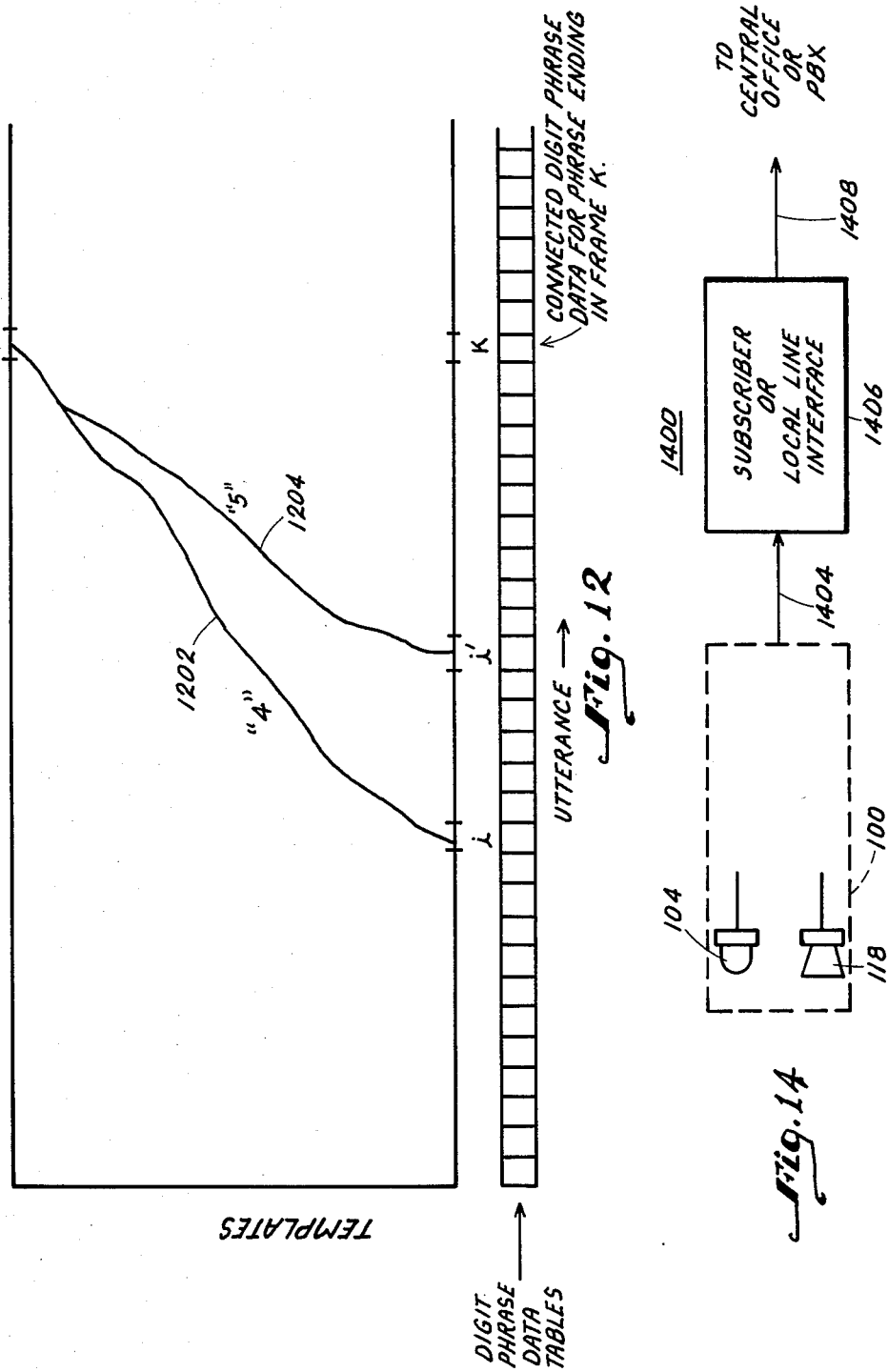
FIG. 12 is a graph illustrating the operation of totaling the path score of the best partial digit phrase portion of the Connected Digit recognition algorithm of FIG. 11.

FIG. 12 shows two templates "4" and "5" ending at the same utterance frame k. The path 1202 of template "4" starts at frame i and the path 1204 of template "5" starts at frame i'. The score for the partial phrase ending in template "4" is computed from the information stored for the partial phrase ending at frame i−1 plus the information known about templates "4"'s path. Similarly template "5" uses the information indexed by frame i'−1. The scores of all partial phrases ending at frame k re compared and the set of five values listed above will be saved (indexed by k) for the lowest scoring partial digit phrase.

The normalized score of the partial path ending at one utterance frame is used as a penalty in starting off all template paths at the next frame. This biases against template paths that follow poor scoring partial digit phrases. At the beginning part of the utterance, where it is impossible for any partial phrase to have ended (due to local path constraints), the penalty is set equal to the utterance frame number times a constant. Template paths are therefore biased towards starting at the beginning of the utterance. This function is the utterance frame penalty computation 1106 (SAVPEN).

In the last few frames of the utterance (determined by CD-end-range) the best scoring digit phrase ending in those frames is selected as the connected digit phrase sequence. The actual sequence of digits making up the phrase is retrieved by the fourth function: best digit phrase retrieval 1108 (GETDGS). This algorithm searches back through the data structures built up while processing the utterance.

Figure 13:
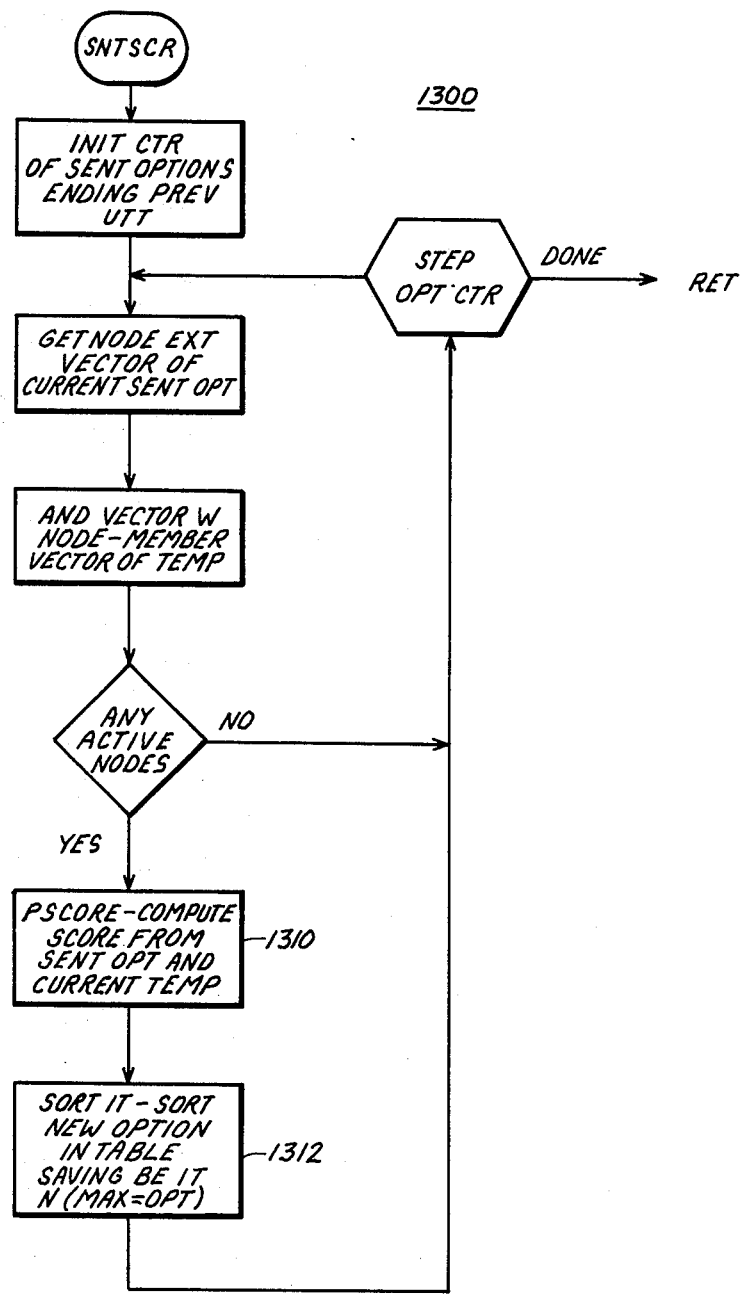
FIG. 13 is a more detailed block diagram of the sentence scoring function of the syntax control portion of the IW/CD algorithm of FIG. 4.

The Syntax Control Subtask 410 comprises two functions. The first is to determine what templates should be active for matching against each utterance in the sentence (see 410 FIG. 7), and the second is to keep track of the best several partial sentence descriptions as the sentence is processed, (FIG. 13).

Referring to FIG. 7, after each utterance is processed 726, the algorithm tests the last template of each partial sentence description ending at the utterance to see if all templates are a member of a final node in the grammer 728. If all templates are, the end-stage flag is set 730 which reduces the amount of non-speech required to end the sentence (discussed above in the end point subtask). The algorithm next checks the scores of the best partial sentence options (BEAMS) 732 to see if the poor scoring ones should be eliminated. If T is the score of the top option and X is the score of a poorer option (X>T) then the later option is dropped if:

(X−T)/T>control threshold (PSCGAP)

The surviving options are transferred to storage indexed by the current utterance number (TRANSP) 734, 736.

Each partial sentence option actually represents a particular node in the finite state grammar. The system relies on two fixed data structures storing the finite state description of the grammar to compute what templates should be matched next in the sentence. The first structure is a node-to-node connection matrix (NODCO). A bit vector is stored for each node, i, with the j'th bit in the vector set to 1 if node i is linked to node j in grammar, and set to 0 if the nodes are not linked. The second data structure (TEMNOD) contains template-node membership information. For each template, t, a bit vector records in what nodes template t has membership. The algorithm (NEXTND) 736 uses the node-to-node membership matrix to compute for each utterance in the sentence a node-extension vector. This bit vector shows the possible next nodes in the grammar that could be reached by extending the grammar one step from the nodes represented by the partial sentence options ending at the utterance. Thus, the node-extension vector at one utterance shows what nodes will be active while processing the next utterance in the sentence. The utterance initialization procedure in the recognition algorithms uses the node-extension vector and the template-node membership information to determine what templates should be marked active. (This is done efficiently with a bitwise AND operation between the node-extension vector and each template-node membership vector). If there are further utterances to be processed, the utterance loop is repeated 737 and 738.

The second function of computing the best partial sentence descriptions at the end of each utterance appears as a subroutine (SNTCSR) 1300 of the recognition algorithms shown in more detail in FIG. 13. As each isolated word template (or sequence of digit templates) is matched against an utterance, the algorithm checks each partial sentence description ending at the previous utterance to see if the template (or digit templates) can legally extend the description 718. At least one of the partial sentence options is guaranteed to extend to the template (or digit templates), since otherwise the template (or digit template set) would not have been matched to the utterance. A normalized path score 1310 is computed for each extended sentence description (PSCORE) and the new option is sorted by score (SORTIT) 1312 so that the best N (N=MAXOPT) partial sentence descriptions will be saved. Since the normalized path score is basically the average frame-to-frame distance for the match, partial sentence descriptions ending in isolated templates or connected digit template sequences compete on equal footing.

The final step in the IWCD algorithm after the last utterance in the sentence has been matched is to search back through the syntax sentence description tables to retrieve the word sequence associated with the best scoring sentence description 740.

The above-described IW/CD apparatus might be used to control one's telephone by voice, rather than by dialing. A block diagram description of a Voice Phone 1400 is shown in FIG. 14. It comprises an isolated word-/connected digit apparatus 100 of the type described herein, including a microphone 100 and speaker 118 connected via bus 1404 to a telephone line interface circuit 1406 for converting digital output signals from 1406 into appropriate dialing signals for transmission over the telephone lines, either subscriber or local lines, 1408. Implementation of an interface box 1406 is considered conventional and obvious to one skilled in the art. The output of IW/CD 100 would be in the form of digital signals representative of the telephone numbers being dialed, and box 1406 would comprise digital-to-analog means to convert the digital signals into appropriate signals as furnished by a conventional push button telephone headset such as those readily available in the market.

As an example of how the Voice Phone operates, consider the following: To call another extension in the same building, for example, say, "INSIDE..." and the four-digit extension number:

"INSIDE... 1234".

The response from the IW/CD is "1234 dialed". This lets you know that the correct number was dialed. Note, there is a pause between INSIDE and 1234 indicated by the... but not between the digits 1234. Another example,

"OUTSIDE... 278... 1234".

Response, "278-1234 CALLED".

Most, if not all, one can do now by dialing a present phone can be done by talking to the Voice Phone of FIG. 14.

While the present invention has been disclosed in connection with the preferred embodiment thereof, it should be understood that there may be other embodiments which fall within the spirit and scope of the invention as defined and by the following claims.

We claim:

1. An apparatus for recognizing sentences of speech, said sentences comprised of utterances separated by pauses and including both isolated words and connected words taken from a predefined finite size vocabulary, said apparatus comprising:
    means including a bandpass filter bank for forming frames of digital signals representative of said sentences of speech; and
    microprocessor means for recognizing said sentences from said frames of digital signals in accordance with a predefined syntax; wherein said means for recognizing said sentences further comprises;
    memory means for storing said predefined vocabulary as isolated word templates and partial phrase connected word templates;
    means for detecting the endpoints of said utterances and for generating an output representative of such endpoint detection;
    isolated word recognizing means responsive to the output of said endpoint detection means for recognizing said isolated words by comparing selected ones of said isolated word templates with said frames of digital signals;
    connected word recognizing means responsive to the output of said endpoint detection means for recognizing said connected words by comparing selected ones of said partial phrase connected word templates with said frames of digital signals; and
    means for selecting said selected ones of said isolated word and partial phrase connected word templates and combining said recognized isolated words and connected words into said sentences in accordance with said predefined syntax.

2. The invention of claim 1, wherein said means for recognizing said connected words comprises recognition of connected digits.

3. The invention of claim 1, wherein said comparison of said selected isolated word templates and said frames of digital signals is done in accordance with a windowed dynamic programming algorithm (DPA).

4. The invention of claim 3, wherein said comparison of said selected isolated word templates and said frames of digital signals is done in accordance with a windowed DPA having path boundary control.

5. The invention of claim 1, wherein said comprarison of said selected partial phrase connected word templates and said frames of digital signals is done in accordance with a full dynamic programming algorithm (DPA).

* * * * *